March 26, 1968 J. C. GIBSON 3,375,330

MULTISWITCH FOR INTERNALLY SELECTIVELY INTERCONNECTING VERTICAL MULTIPLES TO ACCOMPLISH PRIMARY AND SECONDARY CONNECTIONS

Filed Dec. 11, 1963 4 Sheets-Sheet 1

Inventor
J. C. GIBSON
By Phillip A. Weiss
Attorney

March 26, 1968 J. C. GIBSON 3,375,330
MULTISWITCH FOR INTERNALLY SELECTIVELY INTERCONNECTING VERTICAL MULTIPLES TO ACCOMPLISH PRIMARY AND SECONDARY CONNECTIONS
Filed Dec. 11, 1963 4 Sheets-Sheet 2

March 26, 1968 J. C. GIBSON 3,375,330

MULTISWITCH FOR INTERNALLY SELECTIVELY INTERCONNECTING VERTICAL MULTIPLES TO ACCOMPLISH PRIMARY AND SECONDARY CONNECTIONS

Filed Dec. 11, 1963 4 Sheets-Sheet 3

1

3,375,330

MULTISWITCH FOR INTERNALLY SELECTIVELY INTERCONNECTING VERTICAL MULTIPLES TO ACCOMPLISH PRIMARY AND SECONDARY CONNECTIONS

John Clarke Gibson, Oak Lawn, Ill., assignor to International Telephone and Telegraph Corporation Filed Dec. 11, 1963, Ser. No. 329,835
4 Claims. (Cl. 179—22)

ABSTRACT OF THE DISCLOSURE

An automatic telephone exchange having a group of multiswitches with horizontal and vertical paths. Means are provided in the multiswitches for accomplishing a primary-to-secondary type connection using a single vertical multiple.

This invention relates to automatic telephone exchanges and more particularly to switching arrangements for use in such telephone exchanges.

Exchanges of the type described herein extend connections through a multiswitch matrix of crosspoints. The multiswitches, for example, can be the crossbar type of switch.

The crossbar switches are complete units of standard sizes having a plurality of intersecting horizontally and vertically arranged multiple and control components, such as select magnets, for selectively connecting the multiples at the crosspoints.

In order to use the crossbar switches most efficiently for the simultaneous connection of a plurality of calls through the exchange, a primary-secondary switching network is used. Input conductors, such as subscriber lines, are connected to the primary switches. Output conductors, such as trunk lines, are connected to the secondary switches. Thus, for a complete connection from calling to called party at least a primary and a secondary switch are required on both the calling and called sides of the connection.

The resultant proliferation of crossbar switches in primary-secondary telephone exchanges has made it incumbent on telephone engineers to continually seek means for reducing the number of crosspoints and crosspoint controls necessary to effectively handle an equivalent volume of telephone traffic. For example, engineers have for a long time atempted to combine the primary and secondary switches to minimize the number of control components and crosspoints required. Recently, this has been successfully accomplished by a system covered in a patent application filed Sept. 10, 1963, Ser. No. 307,945 by O. E. Ekbergh and P. G. Jonsson, now Patent No. 3,317,676, assignee to the assignee of this invention and entitled "Automatic Telephone Exchange."

The above described invention represents what is believed to be a beneficial step forward in the art. In that system the primary and secondary switches are combined so that the same controls, such as vertical hold magnets, are used for both the primary and secondary switches. Select magnets are used to distinguish between the primary and secondary switches. However, while the arrangement described uses only a total of 40 verticals to permit 20 connections for 100 lines; two verticals are required to connect a line to a trunk located in the same horizontal. This means that two vertical hold magnets and four select magnets are required to connect through four separate crosspoints. Any reduction in control components and crosspoints without loss of service would be highly desirable.

Accordingly, an object of this invention is to provide a new and improved telephone exchange switching system.

2

A further object of this invention is to provide an automatic telephone exchange switching arrangement wherein the crosspoint controls and the number of crosspoints required are minimized.

Yet another object of this invention is to provide a primary-secondary multiswitch arrangement wherein secondary switches share the control components of primary switches and wherein an input to a primary switch can be connected to an output in the same horizontal in the secondary switch using only one vertical.

A related object of this invention is to provide a switching arrangement wherein input conductors and output conductors are connected directly to the same verticals on a multiswitch.

A further object of this invention is to provide automatic telephone exchanges using a multiswitch arrangement for interconnecting subscriber lines and trunk lines wherein a minimum of crosspoints and crosspoint control components are used and traffic is not thereby impaired.

In accordance with one aspect of this invention, an automatic telephone exchange is provided for interconnecting a plurality of subscriber stations via a group of multiswitches having horizontal and vertical paths. Any one of the vertical paths may be connected with any one of the horizontal paths. Each vertical path (comprised of a plurality of multiples) is equipped with a plurality of groups of spring contacts at each horizontal level. At least one group of such spring contacts is used for connecting incoming lines to the vertical path while at least another of said groups of spring contacts is used to connect trunks to the same vertical path. The groups of contacts connected to the lines and the groups of contacts connected to the trunks are individually coupled to separate outputs through the same vertical path. Thus, the selection of the individual trunk or line is under the control of different select bars on the same multiswitch. One of the select bars is used to selectively control contacts that connect the output vertical paths to the input vertical paths through directional select magnet contacts on the same verticals. Therefore, it follows that, a primary-to-secondary type connection is accomplished by using one vertical multiple. This results in an exchange which may require even less than one-half of the switch components as were use in prior exchanges.

The above mentioned and other objects and features of this invention and the manner of obtaining them will become more apparent, and the invention itself will be best understood by reference to the following description of an embodiment of the invention taken in conjunction with the accompanying drawings in which.

Figures 4, 6:
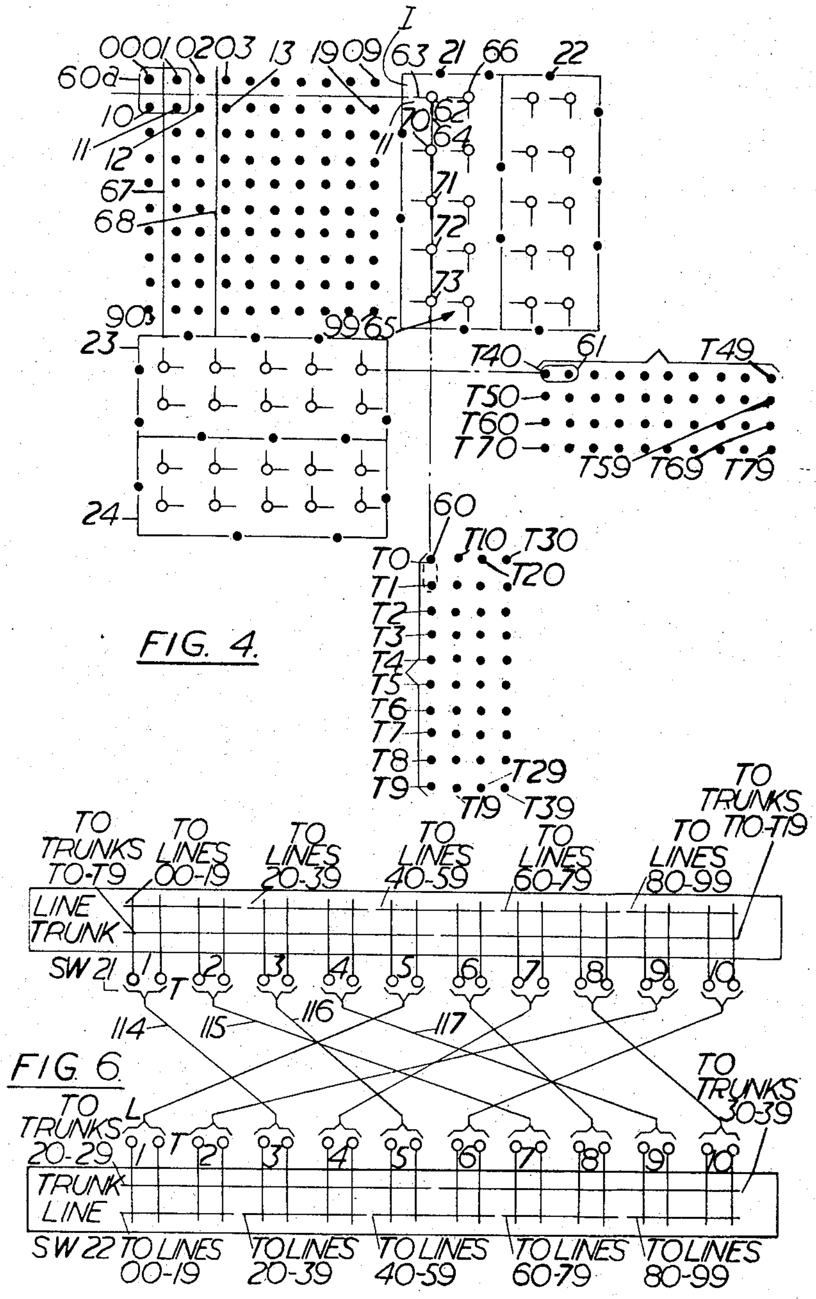
Figure 5:
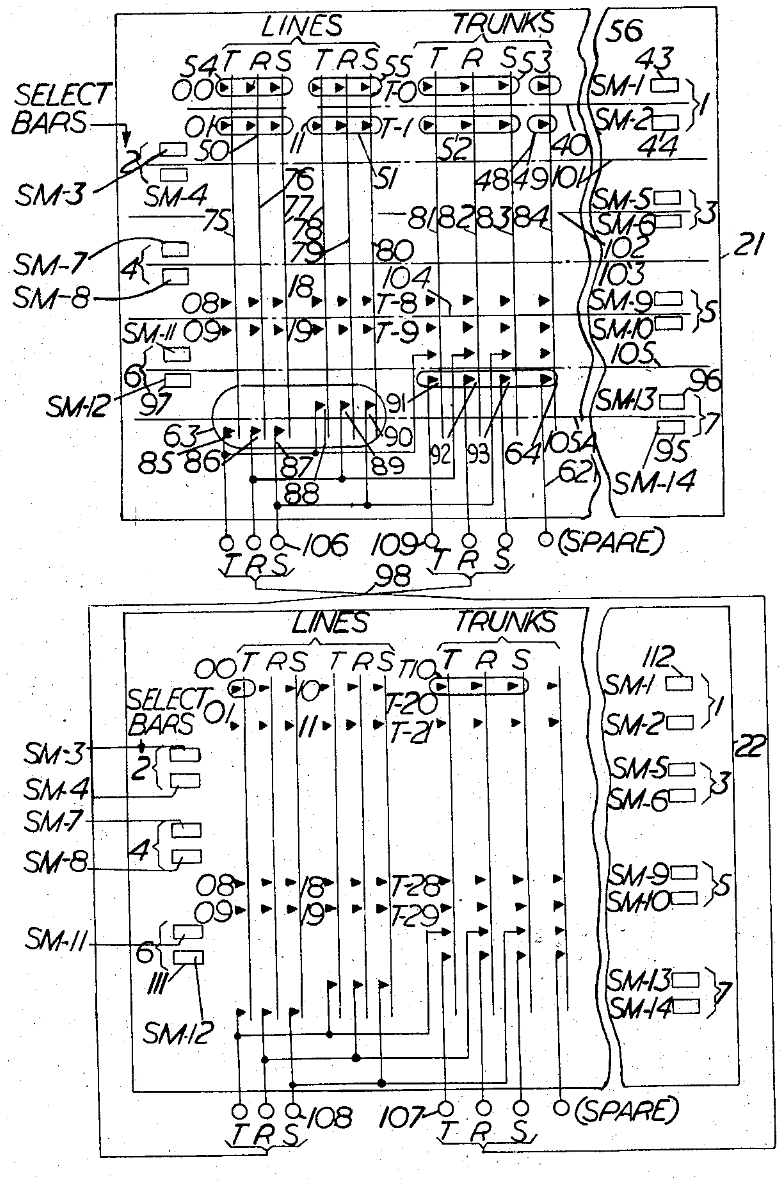

FIG. 4 symbolically shows the switching arrangement made in accordance with the invention;

FIG. 5 schematically shows one vertical multiple on each of two switches connected in accordance with the inventive arrangement; and FIG. 6 schematically shows a method of coupling the switches by a slip multiple arrangement.

Figure 1:
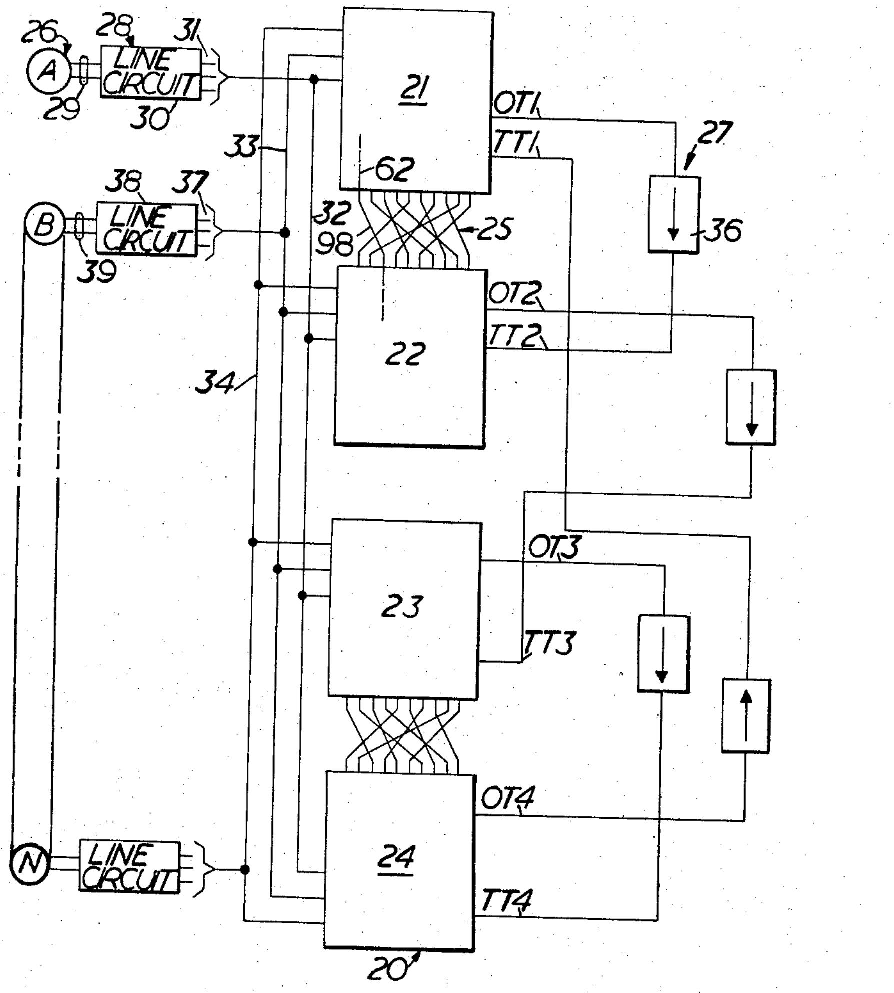
FIG. 1 shows in block diagram form a telephone system utilizing the invention.

FIG. 1 shows an exemplary telephone system utilizing a network 20 of crosspoint contacts, here shown as distributed over four switches 21–24 such as crossbar switches for example.

These switches are slip multipled together in any suitable fashion with one exemplary pattern shown at 25. Thus, the network is constructed as a unitary device and every crosspoint has at least one appearance in each of the switches 21–24; although each crosspoint does not necessarily appear in the same geometrical spot on every switch.

Subscribers lines 26 are connected to one side of the network 20, and control equipment 27 is connected to the other side of the network 20. Each subscriber line connection is extended via an individually associated line circuit 28. For example, the subscriber line A is connected via two wires 29 to an individually associated line circuit 30. The line circuit 30 is connected via three wires 31 to each of the switches 21–24 via a multiple 32. The top two wires in group 31 indicate the well known tip and ring conductors, and the bottom wire indicates the equally well known sleeve conductor. In like manner, subscriber lines B through N are connected to the four switches 21–24 via the multiples 33, 34, respectively. The letter "N" indicates that any number of lines may be so connected.

Each of the control equipments 27 may take any suitable form; however, the invention contemplates use of junctor or link circuits of types which are well known in automatic telephony. For example, conventional crosspoint systems often use junctors of the type described. In general, each junctor is a one-way device (as indicated by the arrow enclosed therein) for extending connections from an originating trunk (OT) to a terminating trunk (TT). The various junctors are connected to the various switches and to any other suitable equipment processing a call, such as registers, in any manner known to those skilled in the art.

The system operates so that when calling subscriber (such as one at station A) removes a receiver or hand set, a loop circuit is completed across the conductors 29. Responsive thereto, line circuit 30 places a demand on the switching network 20 as, for example, by marking its sleeve conductor. This marking causes any available one of the switches 21–24 to complete a circuit to an idle and available originate trunk OT that is in the same horizontal as that in which line 30 appears. In this particular call, it may be assumed that the switch 21 responds to the sleeve marking by connecting lines 31 to junctor 36 via an originate trunk OT1 located in the same horizontal in switch 21 as in line 31. Junctor 36 (or a register—not shown) returns dial tone over this originate trunk OT1 through switch 21 to line A. After this, the calling subscriber dials a wanted number, and junctor 36 further extends the connection over its terminate trunk TT2 to switch 22. In any well known manner, a crosspoint then closes in switch 22 to complete a connection from a trunk in the same horizontal to the called subscriber line. If, for example, subscriber A dialed the directory number of subscriber B, this connection is completed over multiple 33, lines 37, line circuit 38, and conductors 39 to subscriber line B. Thereafter, the junctor 36 transmits a ringing current to subscriber line B, receives answer supervision, and holds the connection for the duration of the call. After the call is over and the subscribers hangup, junctor 36 releases the connection through the switches 21, 22, and the circuit returns to normal.

The invention relates to connections in the various switches 21– 24 as will become apparent from a study of the remaining drawings. However, so that these drawings may be better understood, reference is made to FIGS. 2 and 3 which relate physical components of a crossbar switch to the electrical symbology used elsewhere in the drawings.

Figure 2:
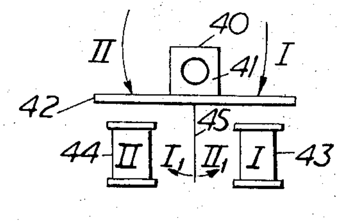
FIG. 2 shows an elevational end-view of a select mechanism of a crossbar switch.

FIG. 2 shows an end view of a portion of a well known crossbar switch. Here a select rod 40 is mounted to turn on a bearing 41. Attached to the select rod 40 is an armature 42 positioned to be attracted by either of two select coils 43, 44. Thus, if select coil 43 is energized, armature 42 rotates on bearing 41 in the direction of Arrow I. This, in turn, deflects a select finger 45 in the direction of arrow $I_1$. If, on the other hand, select coil 44 is energized, armature 42 rotates about bearing 41 in the direction of arrow II. This causes the select finger 45 to move in the direction of the arrow $II_1$.

Figure 3:
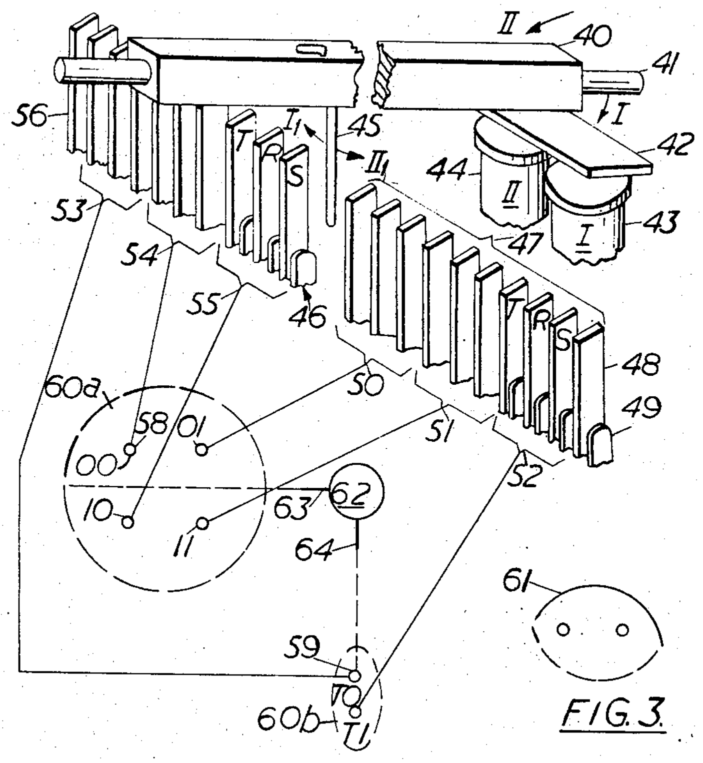
FIG. 3 shows a pictorial view of the select mechanism of FIG. 2 working in conjunction with spring contact pile-ups.

FIG. 3 is a perspective view relating the mechanism of FIG. 2 to electrical contacts at a particular crosspoint. By comparing the reference numerals (which identify the same parts) in FIGS. 2 and 3 the reader will readily understand that energization of select coil 43 ultimately results in closure of a set of contacts 46. In like manner, energization of the select coil 44 utimately closes the contacts 47. Contacts 46 and 47 (which have the same physical construction) comprise a single crosspoint.

Consider the construction of contacts 47 by way of example. These contacts constitute a pile-up of ten sets of contact springs. An exemplary set includes a movable contact 48 and a stationary contact 49. Before operation of the cross-point, these two contacts are electrically isolated from each other. After operation of the crosspoint, contacts 48, 49 touch each other and thereby complete an electrical circuit. To avoid unduly complicating FIG. 3, not all of the stationary contacts such as 49 are shown; however, it should be understood that every movable contact has a stationary contact associated therewith. Also, it should be understood that the contacts of FIG. 3 are shown horizontally disposed only as a generalized and stylized showing. Those familiar with cross-bar switch construction will readily perceive how this showing relates to the crosspoints on their particular crossbar switch.

The ten sets of contacts 47 are divided into three groups 50–52 of contacts each including three sets of contact springs. Each group of contact springs includes tip, ring and sleeve contacts (as designated in group 52 by the letters T, R, and S). The tenth set of contact springs 48, 49 are spares which may be used for any desired control function. It should now be apparent that contacts 46 also include three similar groups of contacts 53–55 with an extra or spare set of contacts at 56.

Portions of FIG. 3 are symbols which also appear in FIG. 4 as indicated by the usage of the same reference numerals. These symbols include small circles which represent inlet or outlet wires. For example, circle 58 may be thought of as a cross-section view of the multiple 32 in FIG. 1. In like manner, the small circle 59 may be thought of as a cross sectional view of trunk OT1. These same small circles are also shown in FIG. 3 as enclosed by correspondingly numbered dot-dashed lines ***60a*, *60b*, and 61. A designator, comprising a circle 62 having two ticks 63, 64 symbolically represents a switch vertical. The circle 62 collectively indicates the stationary contacts in groups 46, 47. The tick 63 indicates means for selecting a line; for example, this means may select between the contacts of groups 54 and 55. In like manner, the tick 64 indicates means for selecting a connection to a trunk. However, the designator 62–64 can not have any effect on any of the circuits in the dot-dashed circle 61 which are shown in FIG. 4 in association with the switches 23, 24**.

Thus, when the finger 45 swings in the direction of the arrow $I_1$, a group of contacts 55 close to complete tip, ring and sleeve connections for a line having the directory number "10". Another group of contacts 54 close to complete similar connections for a line having a directory number "00". The group of contacts 53 close to complete tip, ring, and sleeve connections for a trunk "T0" which may be the trunk OT1 of FIG. 1, for example. In like manner, if the finger 45 swings in the direction $II_1$ contacts 50 complete connections for line "01"; contacts 51 complete connections for line "11"; and contacts 52 complete connections for trunk T1 (which may be trunk TT1 of FIG. 1, for example).

With the above description of how FIG. 4 is to be read, the reader may now determine how the four switches 21–24 control the various crosspoints. For example, switch 21 is shown as comprising ten verticals one of which is indicated symbolically, by the vertical designator 62. Lines 00 to 20 connected to the switch inlets are associated with vertical 62 for connection through the switch to the switch outlets. Whenever any designator is operated only one set of line contacts in any group will be effective. When, for example, designator 62 operates, it is as if tick 63 moves upward or downward. If the I select coil 43 is energized, contacts 54, 55 (FIG. 3) operate to connect lines 00 and 10, in circle 60*a*, through to the switch outlets. The choice of whether line 00 or line 10 is selected depends on which of two horizontal select magnets is energized. If the designator is operated in the other direction, it is as if one of the sets of contacts immediately below tick 63 is selected. Again, the final selection is responsive to which of two horizontal coils is energized. In a similar manner, the tick 64 indicates that a selected trunk T0 or T1 is finally connected to switch outlets responsive to the energization of a horizontal select coil.

FIG. 4 symbolically shows at 65 that each switch is comprised of ten verticals. Twenty lines 00–19 are connected in multiple to two verticals 62, 66 on switch 21. These same twenty lines 00–19 connect to a similar two verticals on switch 22. The subscriber lines are associated with the verticals so that four lines may be connected to each vertical at each crosspoint. Ten trunks are also associated with each vertical, with two trunks connected at each crosspoint. As indicated by the placement of the small trunk indicating circles in FIG. 4, (e.g. 59) each of the trunks is connected in multiple to five verticals in each switch. There are five of the above described crosspoints per vertical. In addition, there are two other crosspoints for selecting between the four lines and two trunks appearing at the crosspoints. Thus, the switch may be described as having seven horizontal levels.

In greater detail on switch 21 for example, twenty subscriber lines 00–19 are connected in multiple to verticals 62, 66. Lines 00, 01, 10, 11 are multiply connected to verticals 62, 66 of switch 21 at a first horizontal level 67. Lines 02, 03, 12, 13 are multiply connected to verticals 62, 66 at a second horizontal level 68. Other lines 04–09 and 14–19 are connected in a like manner at the third through fifth levels.

Trunks T0–T9 are multiply connected to each of five verticals 62 and 70–73 with two trunks connected to each of five different horizontal levels. Thus, trucks T0, T1 may be connected to each of the five verticals 62, 70–73 at the first horizontal level 67. Trunks T8, T9 may be connected to the same five verticals at the fifth level. In this manner, eighty trunks are connected to one hundred lines with the lines and trunks connected to the same verticals.

Means are provided for integrating primary and secondary switching functions in each of the multiswitches. In greater detail, automatic multiswitches are provided with vertical and horizontal paths. Inlets are connected to some of these horizontal paths which function as the primary stage. Outlets are connected to other of these horizontal paths which function as the secondary stage. Each switch therefore, provides both primary and secondary stages. The vertical paths form part of the interstage primary to secondary connections. The structure for accomplishing these ends will be best understood by reference to FIG. 5.

FIG. 5 may be related to FIG. 4 in the following manner. The indicator circle 62 may be thought of as a crosssection view of a bundle of conductors which are shown by the lines 75–84. The tick 63 represents the line selecting contacts 85–90, and the tick 64 represents the trunk connecting contacts 91–93. That is, if coil 95 is energized, contacts 85–87 close to select conductors 75–77. If coil 96 is energized, contacts 88–90 close to select conductors 78–80. Finally, if coil 97 is energized, contacts 91–93 close to select conductors 81–83. FIG. 5 may be related to FIG. 3 in a manner which will be obvious by comparing the reference numerals 50, 51, 54, 55. As will become more apparent, the contacts associated with conductors 75–80 may be termed a "primary stage" and contacts associated with conductors 81–83 may be termed a "secondary stage."

A manner of connecting the lines (primary) to the trunks (secondary) when the lines and trunk to be connected lie in the same horizontal and when they do not lie in the same horizontal is shown in FIG. 5. When the lines and trunks are not in the same horizontal two switches are required as is shown in FIG. 5 where verticals on each of two switches 21, 22 are interconnected via cable 98. Each vertical is shown as comprised of ten conductors 75–84. The first three conductors 75–77 are used for connecting the tip, ring, and sleeve leads of lines 00 to 09; the next three conductors 78–80 are used for connecting the tip, ring and sleeve leads of trunks T0–T9. Conductor 84 is the spare. The manner of connecting the remaining hundred lines through other verticals should be apparent. When the line and trunk are in the same horizontal as for example, line 00 and trunk T0, then the line and trunk are connected on the same vertical through contacts 54, 63, 94 and contacts 53.

Seven select bars 40 and 101–105 are shown for controlling each of the seven horizontal levels. Each select bar is controlled by two select coils of the type previously described with reference to FIGS. 2, 3. For example, select coils 43, 44 are shown as controlling the select bar 40. These two coils select between the lines 00, 10, and 01, 11 respectively, and between the trunks T0 and T1. To further indicate that the schematic representation of FIG. 5 is the same as the pictorial representation of FIGS. 2, 3 the contacts are shown having the same reference numbers 50–56.

Each vertical, such as vertical 62 on switch 21, is enabled when a hold coil (not shown) is energized. Subsequently, a select coil, such as 43, is operated to select two sets of line contacts out of four such sets of line contacts. Also, a select coil such as either select coil 95 or 96 in horizontal level seven, is operated to close contacts 85–87 or 88–89 to select one of the two operated sets of line contacts.

It should be noted that the energization of a select coil, such as 43, also connects the selected trunks to the vertical multiple. The connection between the line and the trunk in the same horizontal is completed when select coil 111 is energized to close contacts 94. The connection to other trunks is completed from switch 21 to switch 22 only when the select coil 97 in horizontal level six is energized to close contacts 91–93.

FIG. 5 also shows how two switches are connected together if the trunk does not lie in the same horizontal as does the line. The tip, ring, and sleeve leads 106 of the lines of switch 21 are connected to the tip, ring and sleeve leads 107 of the trunks of switch 22 through cable 98. In a similar manner, the tip, ring, and sleeve conductors 108 of the lines of switch 22 are connected to the tip, ring, and sleeve conductors 109 of the trunks on switch 21.

Line 00 is connected to trunk T0 (for example) when the vertical hold coil (not shown) associated with vertical 62, on switch 21 is energized. Select coils 43, 95 and 111 are energized. Responsive to the energization of select coil 43 the contacts 54 close to connect line 00 to associated conductors 75–77 and contacts 53 close to connect trunk T0 to conductors 81–83. Responsive to the energization of select coil 95, contacts 85–87 close to connect the conductors 75–77 the tip, ring, and sleeve outlets 106 to contacts 94. Responsive to the energization of select coil 11, contacts 94 close thus interconnecting line 00 to trunk T0. It should be observed that the explanation of the connection between line 00 and trunk T0 was made only by way of example. Other lines and trunks on the same horizontal are similarly connected.

When the line and trunk are not on the same horizontal then the connection is made as described in the above noted copending U.S. patent application. That is, line 00 is connected to trunk T20 (for example) when the vertical hold coil (not shown) associated with vertical 62, on switch 21 is energized. Select coils 43 and 95 are energized. Responsive to the energization of select coil 43 the contacts 54 close to connect line 00 to associated conductors 75–77. Responsive to the energization of select coil 95, contacts 85–87 close to connect the conductors 75–77 the tip, ring, and sleeve outlets 106, cable 98 and the trunk tip, ring and sleeve input conductors 107 on switch 22. On switch 22 the hold coil (not shown) associated with the vertical shown is also energized as are select coils 111, 112. Responsive to the energization of coils 111 and 112 contacts operate to connect line 00 to trunk T20 over an obvious path. It should be observed that the explanation of the connection between switches 21 and 22 was made only by way of example.

FIG. 6 shows a preferred plan for slip multiple coupling between the switches. Therein, lines 114, 115 represent the interswitch cabling for the two verticals serving the twenty lines 00 to 19 and 10 trunks T0–T9. Lines 116, 117 represent the interswitch cabling for the two verticals serving the next twenty lines 20–39 and trunks T0–T9 connected in multiple to the next two verticals. In a similar manner, the rest of the verticals serving lines and trunks are connected from switch 21 to switch 22. Thus, the verticals are interconnected according to the following table:

| Switch 21 vertical | Switch 22 vertical |
|---|---|
| 1 | 3 |
| 2 | 7 |
| 3 | 5 |
| 4 | 9 |
| 5 | 1 |
| 6 | 8 |
| 7 | 4 |
| 8 | 10 |
| 9 | 2 |
| 10 | 6 |

The advantages of this system should now be apparent to those skilled in the art. For example, the system as disclosed, uses four switches 21–24 where prior art exchanges required eight switches. The grouping described herein provides for establishing connections via ten verticals for each subscriber line by using only four multiswitches having a total of forty verticals. Such an efficient grouping is improved by the dual utilization not only of the verticals for connecting both subscriber lines and trunks but also by the use of only one vertical for connecting lines and trunks on the same horizontal. It will be obvious to those skilled in the art than an arrangement of this type provides a loading of the verticals which is considerably greater than that possible in prior arrangements utilizing separate primary and secondary switches.

While the principles of the invention have been described herein in connection with a specific embodiment, it is to be clearly understood that this description is made only by way of example and not as a limitation to the scope of the invention.

We claim:

1. A telephone exchange system comprising a plurality of subscriber lines, and a plurality of trunks, exchange means for interconnecting said lines and trunks, said exchange means comprising a plurality of multiswitches, each of said multiswitches having intersecting horizontal and vertical paths, said horizontal paths comprising upper and lower contacts associated with said vertical paths said lines connected at a plurality of discrete levels to first group of said horizontal paths, said trunks connected at said discrete levels to a second group of said horizontal paths, first selector means for selectively connecting said first group of horizontal paths to a first of said vertical paths through either said upper or said lower contacts and said second group of horizontal paths to a second of said vertical paths through said selected upper or lower contacts on the same one of said multiswitches, and means for selectively connecting said first of said vertical paths to said second of said vertical paths on the same one of said multiswitches said last named means comprising second and third selector means, said second and third selector means controlling upper and lower contacts which are associated with different vertical paths whereby the operation of said second and third selector means selectively operate contacts to connect said first of said vertical paths to said second of said vertical paths.

2. In the telephone exchange system of claim 1 wherein said vertical paths comprise at least three groups of three conductors.

3. In the telephone exchange system of claim 2 wherein each of said group of conductors comprises tip, ring, and sleeve wires.

4. In the telephone exchange system of claim 3 wherein said first selector means comprises select bar means at each of said certain levels, and wherein the second and third select means comprises select bar means at other horizontal levels.

References Cited

UNITED STATES PATENTS

| | | | |
|---|---|---|---|
| 3,048,662 | 8/1962 | Haigh et al. | 179—22 |
| 3,290,447 | 12/1966 | Ohno | 179—25 |
| 3,317,676 | 5/1967 | Ekbergh et al. | 179—22 |

KATHLEEN CLAFFY, *Primary Examiner.*

L. A. WRIGHT, *Assistant Examiner.*